United States Patent Office 3,432,562
Patented Mar. 11, 1969

3,432,562
DEHYDROFLUORINATION PROCESS AND PRODUCTS
Lloyd E. Gardner, Bartlesville, Okla., assignor to Phillips Petroleum Company, a corporation of Delaware
No Drawing. Filed Sept. 24, 1965, Ser. No. 490,070
U.S. Cl. 260—653.5
Int. Cl. C07c 21/18
5 Claims

ABSTRACT OF THE DISCLOSURE

Dehydrofluorination of trifluoroalkanes to produce a high yield of difluoroalkenes by contacting in the vapor-phase with an aluminum fluoride-containing catalyst.

---

This invention relates to the preparation of fluorinated alkenes.

In one of its aspects, this invention relates to dehydrofluorination of trifluoroalkanes to produce difluoroalkenes by vapor-phase contacting the reactants with an aluminum fluoride catalyst. In another aspect, this invention relates to the vapor-phase dehydrofluorination of a trifluoroalkane over an aluminum fluoride-containing catalyst to form with high selectivity cis- and trans-difluoroalkenes. In accordance with another aspect, this invention relates to the vapor-phase dehydrofluorination of 1,1,2-trifluoroethane over an aluminum fluoride-containing catalyst to form with high selectivity cis- and trans-1,2-difluoroethylene.

In the prior art, it is known that fluoroalkenes can be produced from gem-difluoroalkanes utilizing aluminum-containing compounds. It is also known that such compounds as chromic fluoride can be effective catalysts in the dehydrofluorination of polyfluoroalkanes. However, there has not heretofore been known a method for the production of difluoroalkenes from trifluoroalkanes utilizing an aluminum fluoride-containing catalyst to obtain a high conversion of desired cis- and trans-difluoroalkenes.

I have now discovered a method whereby high conversion of trifluoroalkanes to the desired cis- and trans-difluoroalkenes is effected.

The following and other objects are accomplished by the various aspects of this invention.

Accordingly, an object of this invention is to provide an improved process for preparing difluoroalkenes with high selectivity to the desired cis- and trans forms.

Another object of this invention is to provide a process for obtaining a high conversion of trifluoroalkanes to difluoroalkenes.

Yet another object of this invention is to provide a catalyst adapted to form difluoroalkenes with a high degree of conversion.

Other aspects, objects, and the several advantages of this invention are apparent from a study of this disclosure and the appended claims.

In accordance with the present invention, there is provided a method of preparing difluoroalkenes by the vapor-phase dehydrofluorination of trifluoroalkanes over an aluminum fluoride-containing catalyst.

Further, in accordance with this invention, a difluoroalkene having the formula $RCF=CFR$ is produced in high yield by vapor-phase dehydrofluorination over an aluminum fluoride-containing catalyst of a trifluoroalkane having the formula $RCHFCF_2R$, where R is at least one member selected from the group consisting of hydrogen and alkyl radicals, each of said alkyl radicals containing up to and including about 12 carbon atoms, the total number of carbon atoms in said trifluoroalkane being 2 to about 14.

The aluminum fluoride-containing catalyst preferably used in the invention comprises fluorided eta- or gamma-alumina. If desired, the fluorided eta- or gamma-alumina can contain a fluoride of zinc, chromium, cobalt, silver, copper, vanadium, iron, nickel, lead, antimony, or tin. The fluorided eta- or gamma-alumina is conveniently prepared by the vapor-phase reaction of hydrogen fluoride, in the presence or absence of an inert gaseous diluent, with eta- or gamma-alumina at elevated temperatures, or by impregnation with a solution of ammonium fluoride, ammonium bifluoride, or hydrogen fluoride, and subsequent heating of the impregnated catalyst. Fluorided eta- or gamma-alumina containing an additional metal fluoride of the above group can be readily prepared by incorporating the metal in some form in eta- or gamma-alumina, with subsequent fluoridation of the catalyst composite by the methods mentioned above. The metal can be incorporated in the alumina by well known methods such as grinding a salt, oxide, or other form of the metal with the alumina, or by impregnating with solutions containing the metal. Of course, fluorided eta-, or gamma-alumina, or compositions which would yield fluorided eta- or gamma-alumina during the subsequent fluoridation, can be used instead of eta- or gamma-alumina itself.

The aluminum fluoride-containing catalyst can also comprise fluorided bauxite in the presence or absence of a fluoride of zinc, chromium, cobalt, silver, copper, vanadium, iron, nickel, lead, antimony, or tin. These catalyst compositions can be prepared through the use of bauxite by the methods described above for the preparation of catalysts from eta- or gamma-alumina.

The difluoroalkenes produced by the method of this invention can have either a cis or a trans configuration. Therefore, the difluoroalkenes obtained in the dehydrofluorination constitute a mixture of the geometric cis and trans isomers.

As an illustration of the process of this invention, a mixture of cis- and trans-1,2-difluoroethylene is produced by dehydrofluorination of 1,1,2-trifluoroethane. Similarly, a mixture of cis- and trans-1,2-difluoropropene is prepared by dehydrofluorination of either 1,1,2-trifluoropropane or 1,2,2-trifluoropropane, and a mixture of cis- and trans-2,3-difluoro-2-butene is obtained by dehydrofluorination of 2,2,3-trifluorobutane.

Examples of some trifluoroalkanes which can be dehydrofluorinated by the process of this invention include, in addition to those named above, 1,1,2-trifluorobutane, 1,2,2 - trifluorobutane, 1,1,2 - trifluoropentane, 2,2,3-trifluoropentane, 1,2,2-trifluoro-4-methylpentane, 1,1,2-trifluorohexane, 3,4,4, - trifluoroheptane, 1,1,2 - trifluorooctane, 1,2,2 - trifluorooctane, 2,3,3 - trifluorodecane, 2-methyl - 3,3,4 - trifluoro-6-ethyloctane, 5,5,6-trifluorododecane, 1,1,2-trifluorotetradecane, and 7,7,8-trifluorotetradecane.

Of course, a gaseous stream consisting essentially of a mixture containing a trifluoroalkane with other non-readily decomposable materials can be used in the process of this invention. For example, a diluent could be mixed with a trifluoroalkane, and the mixture dehydrofluorinated.

The reaction temperature, pressure, and flow rate of reactants can vary appreciably depending upon the particular reactants being utilized. Although the reaction temperature can be varied over a wide range, it will usually be within the range of about 400–1,000° F., preferably within the range of about 600–850° F. The flow rate of the trifluoroalkane will usually be within the range of about 10–1,000 gaseous volumes (standard conditions) per volume of catalyst per hour, preferably within the range of about 15–150 volumes (standard conditions) per volume of catalyst per hour. Although the pressure is conveniently maintained at substantially atmospheric, pressures somewhat above or below atmospheric can be employed. Ordinarily, the pressure will be within the range of about 0–100 p.s.i.g., preferably within the range of about 0–50 p.s.i.g.

Examples of some difluoroalkanes which can be produced by the process of this invention include, in addition to those named above, cis-1,2-difluoro-1-butene, trans-1,2-difluoro-1-pentene, cis-2,3-difluoro-2-pentene, trans-1,2-difluoro-4-methyl-1-pentene, cis-1,2-difluoro-1-hexene, trans-3,4-difluoro-3-heptene, cis-1,2-difluoro-1-octene, trans-2,3-difluoro-2-decene, cis-3,4-difluoro-2-methyl-6-ethyl-3-octene, trans-5,6-difluoro-5-dodecene, cis-1,2-difluoro-1-tetradecene, and trans-7,8-difluoro-7-tetradecene.

The isomeric cis- and trans-difluoroalkenes can be separated from the unreacted trifluoroalkanes and from the minor amounts of by-products by suitable techniques such as distillation, chromatography, extraction, and the like, preferably with prior removal of hydrogen fluoride, e.g., with water or an aqueous solution of caustic. The unreacted trifluoroalkanes can be recycled to the reactor.

The cis- and trans-difluoroalkenes produced by the process of this invention can be used individually or as a mixture in the preparation of useful polymers.

The following specific examples are illustrative of the advantages of this invention. Example I illustrates the preparation of a catalyst used in this invention.

Example I

A fluorided alumina catalyst was prepared by first impregnating eta-alumina in the form of ⅛-inch pills with a solution obtained by dissolving 164.5 g. of ammonium bifluoride in 500 ml. of water. The impregnation was repeated until the catalyst had received a total of five impregnations, the catalyst being drained and dried after each impregnation. The catalyst was then heated at 1000° F. in a stream of nitrogen for six hours, after which fluoridation of the catalyst was completed by heating at 600° F. for about three hours in a stream of hydrogen fluoride containing 50 volume percent nitrogen. The resulting fluorided alumina catalyst contained 59.1 weight percent fluorine and had a surface area of 15 m.²/g.

Example II

A metered stream of 1,1,2-trifluoroethane (containing one weight percent 1,1-difluoroethane as an impurity) was passed over 100 ml. of the fluorided alumina catalyst prepared in Example I for 1.33 hours at a rate of 52 volumes of the gas per volume of catalyst per hour. The catalyst temperature was maintained at about 800° F.; the pressure was atmospheric. The reactor effluent was passed through a water scrubber to remove hydrogen fluoride, after which the wet gas was dried by passing it through Drierite[1]. Samples of the dried effluent, free of hydrogen fluoride, were obtained at the end of 0.9 hour and 1.3 hours, and analyzed by gas chromatography, identification of the components being carried out through mass spectrometer analysis. The results of the gas chromatographic analysis of the dry, hydrogen fluoride-free effluent are shown in Table I. A total of 19.0 g. of dry reactor effluent, free of hydrogen fluoride, was collected by passing the dry effluent into a vessel immersed in a bath at −80° C.

[1] Anhydrous calcium sulfate.

TABLE I

| Component | Composition of dry HF-free effluent, weight percent | |
|---|---|---|
| | After 0.9 hour | After 1.3 hours |
| $CH_2=CF_2$ | 0.4 | 0.3 |
| $CH_2=CHF$ | 1.3 | 1.4 |
| Trans-$CHF=CHF$ | 21.5 | 21.1 |
| Cis-$CHF=CHF$ | 71.2 | 70.8 |
| $CH_2FCHF_2$ | 5.6 | 6.4 |

Thus on the basis of gas chromatographic analysis, approximately 95 percent of the 1,1,2-trifluoroethane was converted, with high selectively to the desired cis- and trans-1,2-difluoroethylene.

Example III

Another experiment was carried out by the procedure of Example II, but at a lower temperature and a lower space velocity. A metered stream of 1,1,2-trifluoroethane (containing one weight percent 1,1-difluoroethane) was passed over 100 ml. of the fluorided alumina catalyst prepared in Example I for 1.92 hours at a rate of 18 volumes of the gas per volume of catalyst per hour. The catalyst temperature was maintained at 715–730° F.; the pressure was atmospheric. The reactor effluent was passed through water to remove hydrogen fluoride and then dried as in Example II. A sample of the dried effluent, free of hydrogen fluoride, was obtained at the end of 50 minutes and analyzed by gas chromatography. The results of this analysis are shown in Table II.

Table II

| Component: | Composition of dry HF-free effluent, weight percent |
|---|---|
| $CH_2=CF_2$ | 0.4 |
| $CH_2=CHF$ | 0.8 |
| Trans-$CHF=CHF$ | 8.2 |
| Cis-$CHF=CHF$ | 81.4 |
| $CH_2FCF_2$ | 9.1 |
| Other | 0.1 |

Thus, on the basis of gas chromatographic analysis, approximately 93 percent of the 1,1,2-trifluoroethane was converted, again with high selectively to the desired cis- and trans-1,2-difluoroethylene.

Example IV

In another experiment, chromic fluoride was employed as a dehydrofluorination catalyst under conditions similar to those employed in Example II in which a fluorided alumina catalyst was used. A metered stream of 1,1,2-trifluoroethane (containing one weight percent 1,1-difluoroethane) was passed over 100 ml. of chromic fluoride in the form of ³⁄₁₆-inch pills for 2.17 hours at a rate of 55 volumes of the gas per volume of catalyst per hour. The catalyst temperature was maintained at about 800° F.; the pressure was atmospheric. The reactor effluent was passed through water to remove hydrogen fluoride and then dried as in Example II. Samples of the dried effluent, free of hydrogen fluoride, were collected at the end of 13, 35, 60, 75, and 105 minutes, and each sample was analyzed by gas chromatography. The averages of the analytical values obtained for the five samples are given in Table III.

Table III

| Component: | Composition of dry HF-free effluent, weight percent |
|---|---|
| $CH_2=CF_2$ | 1.0 |
| Trans-$CHF=CHF$ | 4.1 |
| Cis-$CHF=CHF$ | 29.2 |
| $CH_2FCHF_2$ | 65.3 |
| Other | 0.4 |

Thus, on the basis of gas chromatographic analysis, the conversion of 1,1,2-trifluoroethane was approximately 41 percent, substantially less than that obtained in Example II with the fluorided alumina catalyst. Therefore, chromic fluoride is decidedly inferior to fluorided alumina as a catalyst for use in the process of this invention.

Reasonable variation and modification of this invention are possible within the scope of the foregoing disclosure and the appended claims to the invention, the essence of which is that there has been provided a method for converting trifluoroalkanes to difluoroalkenes in high yields by vapor-phase contacting the reactants with an aluminum fluoride-containing catalyst.

I claim:
1. A process for dehydrofluorinating trifluoroalkanes whereby a high conversion of trifluoroalkanes to cis- and trans-difluoroalkenes is effected which comprises contacting under vapor-phase conditions a trifluoroalkane having the formula $RCHFCF_2R$ to form a difluoroalkene having the formula $RCF=CFR$, wherein R is at least one member selected from the group consisting of hydrogen and alkyl radicals containing from 1 to 12 carbon atoms, the total number of carbon atoms in said trifluoroalkane being 2 to about 14, with an aluminum fluoride-containing catalyst selected from fluorided eta-alumina, fluorided gamma-alumina, fluorided bauxite, said aluminum fluoride-containing catalyst having been prepared by the vapor phase reaction of hydrogen fluoride in the presence or absence of an inert gaseous diluent with eta- or gamma-alumina or bauxite at elevated temperatures or by impregnation with a solution of ammonium fluoride, ammonium bifluoride, or hydrogen fluoride and subsequent heating of the impregnated catalyst, and the aforementioned fluorided materials containing an additional metal fluoride selected from zinc, chromium, cobalt, silver, copper, vanadium, iron, nickel, lead, antimony, and tin fluorides, and mixtures thereof, said contacting being effected within a temperature range varying from about 400° F. to about 1000° F., a flow rate of trifluoroalkane within the range of about 10 to 1000 volumes per volume of catalyst per hour, and wherein the pressure ranges from about 0 to 100 p.s.i.g.

2. A process according to claim 1 wherein said aluminum fluoride-containing catalyst is selected from fluorided eta-alumina and fluorided gamma-alumina.

3. A process according to claim 1 wherein said trifluoroalkane is 1,1,2-trifluoroethane and said difluoroalkene is 1,2-difluoroethylene.

4. A process according to claim 1 wherein said trifluoroalkane is a gaseous stream consisting essentially of 1,1,2-trifluoroethane wherein the contacting is effected at a temperature in the range of 600° F.–850° F. with fluorided eta-alumina to produce a high yield of cis- and trans-1,2-difluoroethylene.

5. A process according to claim 1 wherein the reaction temperature varies in the range of about 600° F. to 850° F., the rate of flow of trifluoroalkane varies within the range of about 15 to 150 volumes per volume of catalyst per hour, and wherein at least about 90 percent conversion to cis- and trans-difluoroalkene is obtained.

References Cited

UNITED STATES PATENTS

| | | |
|---|---|---|
| 3,118,005 | 1/1964 | Pavlath et al. 260—653.5 |
| 2,478,933 | 8/1949 | Bratton et al. 260—653.5 |
| 2,480,560 | 8/1949 | Downing et al. 260—653.5 |
| 2,478,932 | 8/1949 | Miller et al. 260—653.5 |

FOREIGN PATENTS 704,720   3/1965   Canada.

DANIEL D. HORWITZ, *Primary Examiner.*

U.S. Cl. X.R.

252—442